(12) United States Patent
Nádas et al.

(10) Patent No.: US 10,021,587 B2
(45) Date of Patent: Jul. 10, 2018

(54) CONGESTION CONTROL IN A TRANSPORT NETWORK

(71) Applicant: Telefonaktiebolaget LM Ericsson (publ), Stockholm (SE)

(72) Inventors: Szilveszter Nádas, Budapest (HU); Sándor Rácz, Cegléd (HU); Norbert Reider, Tényö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 15/022,105

(22) PCT Filed: Oct. 7, 2013

(86) PCT No.: PCT/SE2013/051172
§ 371 (c)(1),
(2) Date: Mar. 15, 2016

(87) PCT Pub. No.: WO2015/053664
PCT Pub. Date: Apr. 16, 2015

(65) Prior Publication Data
US 2016/0234712 A1    Aug. 11, 2016

(51) Int. Cl.
*H04W 28/02* (2009.01)
*H04W 88/08* (2009.01)
*H04W 88/12* (2009.01)

(52) U.S. Cl.
CPC ... *H04W 28/0247* (2013.01); *H04W 28/0273* (2013.01); *H04W 88/08* (2013.01); *H04W 88/12* (2013.01)

(58) Field of Classification Search
CPC ......... H04W 28/0247; H04W 28/0273; H04W 88/12; H04W 88/08
See application file for complete search history.

(56) References Cited

U.S. PATENT DOCUMENTS 9,112,797 B2 *   8/2015   Ludwig ................... H04L 47/10
2005/0270996 A1 * 12/2005   Yi ......................... H04L 1/1841
                                                               370/312

(Continued)

FOREIGN PATENT DOCUMENTS

WO       2011120581 A1   10/2011
WO    WO 2011120581 A1 * 10/2011  ............. H04L 47/10

(Continued)

OTHER PUBLICATIONS

3GPP TS 25.435 V11.1.0(Dec. 2012) 3rd Generation Partnership Project; Technical Specification Group Radio Access Network; UTRAN Iub interface user plane protocols for Common Transport Channel data streams.*
Allman, M., et al., "TCP Congestion Control," Network Working Group, RFC: 5681, Sep. 2009, trustee.ietf.org/license-info, IETF Trust, pp. 1-18.
Author Unknown, "Technical Specification Group Radio Access Network; Radio Link Control (RLC) protocol specification (Release 11)," Technical Specification 25.322, Version 11.2.0, 3GPP Organizational Partners, Mar. 2013, 90 pages.
Author Unknown, "Technical Specification Group Radio Access Network; UTRAN Iub interface user plane protocols for Common Transport Channel data streams (Release 11)," Technical Specification 25.435, Version 11.1.0, 3GPP Organizational Partners, Dec. 2012, 64 pages.

(Continued)

*Primary Examiner* — Andrew Lai
*Assistant Examiner* — Harry H Kim
(74) *Attorney, Agent, or Firm* — Withrow & Terranova, PLLC

(57) ABSTRACT

A congestion control method of a cellular communication system is disclosed. A first protocol data unit having a first sequence number is transmitted from a radio network controller to a base station via a transport network. The base station detects a congestion situation of the transport network by detecting loss of the first protocol data unit during transmission over the transport network. In response to detecting the congestion situation, a notification message indicative of the detected congestion situation is transmitted from the base station to the radio network controller via the interface of the transport network.

9 Claims, 3 Drawing Sheets

(56) References Cited

U.S. PATENT DOCUMENTS

| | | | |
|---|---|---|---|
| 2009/0268706 A1* | 10/2009 | Featherstone | H04L 1/187 370/345 |
| 2010/0311433 A1* | 12/2010 | Lindskog | H04W 72/1242 455/450 |
| 2011/0044168 A1* | 2/2011 | N das | H04L 1/0002 370/232 |
| 2013/0250853 A1 | 9/2013 | Eravelli et al. | |

FOREIGN PATENT DOCUMENTS

| | | |
|---|---|---|
| WO | 2012115545 A1 | 8/2012 |
| WO | 2013070162 A1 | 5/2013 |
| WO | 2013070164 A2 | 5/2013 |
| WO | 2014063718 A1 | 5/2014 |

OTHER PUBLICATIONS

Nádas, Szilveszter, et al., "Chapter 9 HSPA Transport Network Layer Congestion Control," HSDPA/HSUPA Handbook (book), 2011, CRC Press, Taylor & Francis Group, LLC, 42 pages.
Samsung, et al., "TD S2-131637: How to handle the absence of uplink packets for congestion notification," $3^{rd}$ Generation Partnership Project (3GPP), TSG SA WG2 Meeting #97, Temporary Document, May 27-31, 2013, 2 pages, Busan, Korea.
International Search Report and Written Opinion for International Patent Application No. PCT/SE2013/051172, dated Jun. 3, 2014, 10 pages.

\* cited by examiner

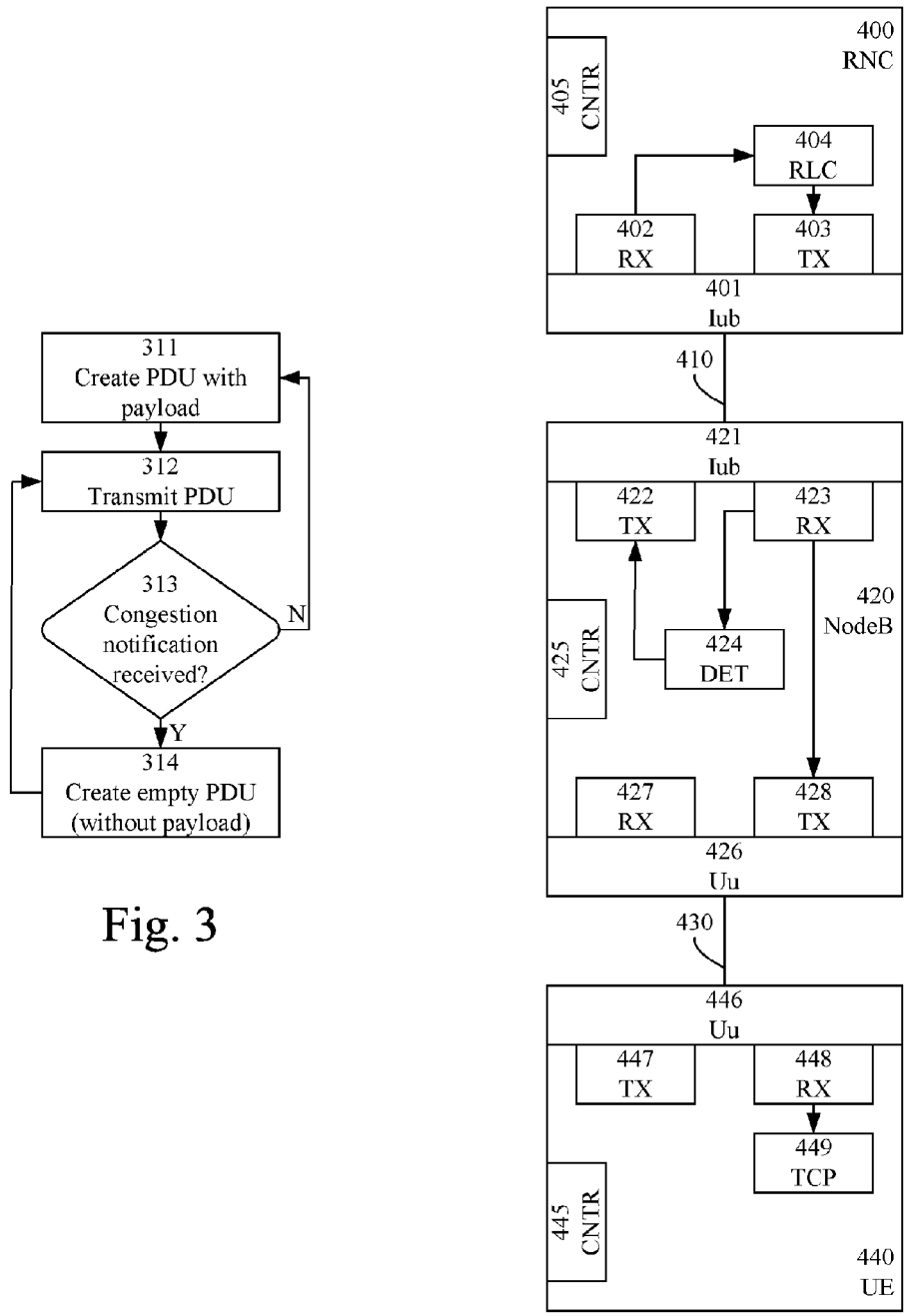

CONGESTION CONTROL IN A TRANSPORT NETWORK

This application is a 35 U.S.C. § 371 national phase filing of International Application No. PCT/SE2013/051172, filed Oct. 7, 2013, the disclosure of which is incorporated herein by reference in its entirety.

TECHNICAL FIELD

The present invention relates generally to the field of congestion control of a transport network. More particularly, it relates to congestion control of a transport network particularly applicable when an automatic retransmission scheme is applied.

BACKGROUND

FIG. 1 is a schematic illustration of a part of a cellular communication network in communication with a User Equipment (UE) 120. The cellular communication network comprises a base station (e.g. NodeB) 110 and a radio network controller (RNC) 100. The base station and the RNC may or may not be co-located and may be implemented within a same device or in different devices. A radio link 121 transports information over the air between the base station 110 and the user equipment 120 and a transport link or transport network (TN) 101 connects the base station 110 and the RNC 100 and is used to transport information there between.

Traffic congestion may appear in a cellular communication network. For example, in a network applying High-Speed Downlink Packet Access (HSDPA) capacity limiting congestion may arise on the radio link and/or in the transport network.

The Internet protocol Transmission Control Protocol (TCP) provides an efficient congestion control mechanism. However, the TCP cannot be used directly to resolve congestion situations between the RNC and the UE when HSDPA is applied. This is due to that the Radio Link Control (RLC) protocol will be in Acknowledged Mode (AM) when HSDPA is applied. Hence, since RLC AM provides re-transmission of packets that are lost in transmission between the RNC and the UE due to a congestion situation, TCP will not register any packet losses and will not initiate its congestion avoidance mechanism. Contrarily, TPC will typically continue to feed more packets to the lower layers and thereby contribute even more to the congestion.

Even though the problem and suggested embodiments herein will be exemplified in the context of HSDPA and TPC, the same situation may appear in connection with other known or future protocols based on retransmission being applied together with other known or future protocols with congestion avoidance based on detection of corrupted or lost packets.

In HSDPA, the RLC AM protocol is responsible for reliable data transmissions in Layer 2 between the RNC and the UE (see e.g. Third Generation Partnership Project (3GPP) Technical Specification (TS) 25.322). An AM RLC entity can act either as a sender or as a receiver depending on the applicable elementary procedure, where the sender transmits RLC AM Protocol Data Units (PDUs) and the receiver receives and processes the RLC AM PDUs. The RLC AM provides reliable transmission and seamless handover and channel switching operations. Data packets lost between the RNC and the UE (e.g. due to bad link conditions of the radio link and/or the transport network link) are re-transmitted. Thus, the RLC AM provides avoidance (or at least minimization) of packet losses, which is beneficial for TCP in terms of utilizing network capabilities, at the cost of a possible increase in average round trip time (RTT). However, if packets are lost due to congestion, the re-transmission protocol will typically keep re-transmitting packets which will add further to the congestion situation and conceal the congestion situation to the TCP.

Some solutions exist to handle congestion in the transport network of a HSDPA system. For example, the Iub Framing Protocol (FP) may be used to detect congestion at the base station and standardized signaling messages may be used to inform the RNC about the detected congestion.

A detailed description of TN congestion detection and control mechanisms and the Iub Framing Protocol may be found, for example, in "HSDPA/HSUPA Handbook", CRC Press 2010, edited by Borko Furht and Syed A. Ahsson, pp. 297-330, Chapter 9, "HSPA Transport Network Layer Congestion Control", by Szilveszter Nádas, Sándor Rácz and Pál L. Pályi.

Since a lost (or dropped) packet is re-transmitted by the RLC AM protocol, a lost RLC PDU does not result in a RLC Service Data Unit (SDU) loss, which would be beneficial to inform the TCP about a congestion situation.

In a first example congestion avoidance approach (see e.g. WO2011/120581), the RNC may drop an application level packet (e.g. RLC SDU) when it is informed about the detected congestion to notify the TCP about the congestion situation.

In a second example congestion avoidance approach, the NodeB does not necessarily inform the RNC about a detected congestion, but deliberately corrupts a RLC PDU (e.g. the next PDU) before transmission to the UE over the radio link. This will result in an erroneous TCP Cyclic Redundancy Check (CRC) at the UE and, thus, the TCP is notified about the congestion situation.

See also e.g. WO2012/115545 and WO2013/070162 for other example congestion avoidance approaches.

There is a need for alternative approaches to avoidance of transport network congestion when a re-transmission protocol is applied.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to provide alternative approaches to avoidance of transport network congestion when a re-transmission protocol is applied.

According to a first aspect, this is achieved by a congestion control method of a radio network controller of a cellular communication system, wherein the radio network controller comprises a radio link controller and wherein the radio network controller is connectable to a base station of the cellular communication system via a transport network and the base station is connectable to a wireless communication device via a radio link.

The method comprises transmitting (to the base station via an interface of the transport network) a first protocol data unit having a first sequence number, receiving (from the base station via the interface of the transport network) a notification message indicative of a congestion situation of the transport network, creating (by the radio link controller) a second protocol data unit, wherein the second protocol data unit is empty to indicate the congestion situation to a Transmission Control Protocol (TCP) of the wireless communication device, and transmitting (to the base station via the interface of the transport network) the second protocol data unit.

The congestion situation may comprise a loss of the first protocol data unit during transmission over the transport network according to some embodiments.

In some embodiments, the notification message may be further indicative of the first sequence number.

Creating the second protocol data unit may, according to some embodiments, comprise creating the second protocol data unit having the first sequence number.

In some embodiments, creating the second protocol data unit may comprise creating the second protocol data unit having a next available sequence number in a consecutive sequence of yet unused sequence numbers of the radio link controller.

According to some embodiments, the method may further comprise creating (by the radio link controller) one or more further protocol data units, wherein the one or more further protocol data units are empty, and transmitting (to the base station via the interface of the transport network) the one or more further protocol data units.

The notification message may, in some embodiments, comprise one of a High Speed Data Shared CHannel (HS-DSCH) Protocol Data Unit Drop Indication Iub Framing Protocol Control Frame and a HS-DSCH Capacity Allocation Iub Framing Protocol Control Frame as defined in the Third Generation Partnership Technical Specification 25.435, version 11.1.0 of December 2012.

A second aspect is a congestion control method of a cellular communication system comprising a radio network controller, a base station and a wireless communication device, wherein the radio network controller comprises a radio link controller, wherein the radio network controller is connectable to the base station via a transport network and wherein the base station is connectable to the wireless communication device via a radio link.

The method comprises transmitting (from the radio network controller to the base station via an interface of the transport network) a first protocol data unit having a first sequence number and detecting (by the base station) a congestion situation of the transport network by detecting loss of the first protocol data unit during transmission over the transport network.

The method further comprises transmitting (from the base station to the radio network controller via the interface of the transport network) a notification message indicative of the detected congestion situation and receiving (by the radio network controller) the notification message.

The method also comprises creating (by the radio link controller of the radio network controller) a second protocol data unit, wherein the second protocol data unit is empty to indicate the congestion situation to a Transmission Control Protocol (TCP) of the wireless communication device and transmitting (from the radio network controller to the base station via the interface of the transport network) the second protocol data unit.

Thereafter, the method comprises receiving (by the base station) the second protocol data unit, transmitting (from the base station to the wireless communication device via an air interface of the radio link) the second protocol data unit and receiving (by the wireless communication device) the second protocol data unit.

The method also comprises triggering (by the TCP of the wireless communication device) detection of the congestion situation based on decoding of the second protocol data unit and entering a congestion avoidance mode of the TCP.

A third aspect is a computer program product comprising a computer readable medium, having thereon a computer program comprising program instructions, the computer program being loadable into a data-processing unit and adapted to cause the data-processing unit to execute method steps according to any of the first and second aspects when the computer program is run by the data-processing unit.

A fourth aspect is a congestion control arrangement for a radio network controller of a cellular communication system, wherein the radio network controller is connectable to a base station of the cellular communication system via a transport network and the base station is connectable to a wireless communication device via a radio link. The arrangement comprises a transmitter, a receiver and a radio link controller.

The transmitter is adapted to transmit (to the base station via an interface of the transport network) a first protocol data unit having a first sequence number and a second protocol data unit.

The receiver is adapted to receive (from the base station via the interface of the transport network and in response to the transmitter transmitting the first protocol data unit) a notification message indicative of a congestion situation of the transport network.

The radio link controller is adapted to create the first protocol data unit, and to (in response to the receiver receiving the notification message) create the second protocol data unit as an empty protocol data unit to indicate the congestion situation to a Transmission Control Protocol (TCP) of the wireless communication device.

According to some embodiments, the congestion situation may comprise a loss of the first protocol data unit during transmission over the transport network and the notification message may be further indicative of the first sequence number. The radio link controller may then be further adapted to create the second protocol data unit having the first sequence number.

In some embodiments, the radio link controller may be further adapted to create the second protocol data unit having a next available sequence number in a consecutive sequence of yet unused sequence numbers of the radio link controller.

According to some embodiments, the radio link controller may be further adapted to create one or more further protocol data units as empty protocol data units (each having a respective next available sequence number in a consecutive sequence of yet unused sequence numbers of the radio link controller) and the transmitter may be further adapted to transmit (to the base station via the interface of the transport network) the one or more further protocol data units.

According to a fifth aspect a radio network controller for a cellular communication system is provided comprising the arrangement according to the fourth aspect.

A sixth aspect is a cellular communication system comprising a radio network controller, a base station and a wireless communication device, wherein the radio network controller is connectable to the base station via a transport network and wherein the base station is connectable to the wireless communication device via a radio link. The system comprises:

A transmitter of the radio network controller, adapted to transmit (to the base station via an interface of the transport network) a first protocol data unit having a first sequence number and a second protocol data unit.

A congestion detector of the base station, adapted to detect a congestion situation of the transport network by detecting loss of the first protocol data unit during transmission over the transport network.

A transport network transmitter of the base station adapted to transmit (to the radio network controller via the interface of the transport network and in response to the congestion detector detecting the congestion situation) a notification message indicative of the detected congestion situation.

A receiver of the radio network controller adapted to receive the notification message.

A radio link controller of the radio network controller adapted to create the first protocol data unit, and adapted to (in response to the receiver receiving the notification message) create the second protocol data unit as an empty protocol data unit to indicate congestion to a Transmission Control Protocol (TCP) of the wireless communication device.

A receiver of the base station adapted to receive the second protocol data unit.

A radio link transmitter of the base station adapted to transmit (to the wireless communication device via an air interface of the radio link) the second protocol data unit.

A receiver of the wireless communication device adapted to receive the second protocol data unit.

A TCP module of the wireless communication device adapted to trigger detection of the congestion situation based on decoding of the second protocol data unit and adapted to enter a congestion avoidance mode of the TCP.

In some embodiments, the second, third, fourth, fifth and sixth aspects may additionally have features identical with or corresponding to any of the various features as explained above for the first aspect.

An advantage of some embodiments is that an alternative solution to avoidance of transport network congestion when is provided.

Another advantage of some embodiments is that the transport network and/or the radio link are not unnecessarily loaded. For example, the number of re-transmissions due to the congestion may be minimized and the amount of un-useful data (e.g. deliberately corrupted data or packets known to be corrupted) transmitted may be kept to a minimum amount.

A further advantage of some embodiments is that the average round trip time and/or the delay until the TCP detects the congestion may be decreased.

Yet a further advantage of some embodiments is that the capacity of the transport network and/or the radio link may be better utilized by avoiding transmission of data that has already been transmitted or that is known to be dropped when received. That is, the load on the transport network and/or the radio link may be reduced.

BRIEF DESCRIPTION OF THE DRAWINGS

Further objects, features and advantages will appear from the following detailed description of embodiments, with reference being made to the accompanying drawings, in which:

FIG. 3 is a flowchart illustrating example method steps according to some embodiments;

FIG. 4 is a block diagram illustrating example arrangements according to some embodiments;

DETAILED DESCRIPTION

In the following, embodiments will be described providing approaches to avoidance of transport network congestion when a re-transmission protocol is applied. Even though the embodiments herein will be exemplified in the context of HSDPA, various embodiments may be equally applicable in situations with other known or future protocols based on retransmission. Similarly, even though the embodiments herein will be exemplified in the context of TCP, various embodiments may be equally applicable in situations with other known or future protocols handling congestion based on detection of corrupted or lost packets.

Figure 1:
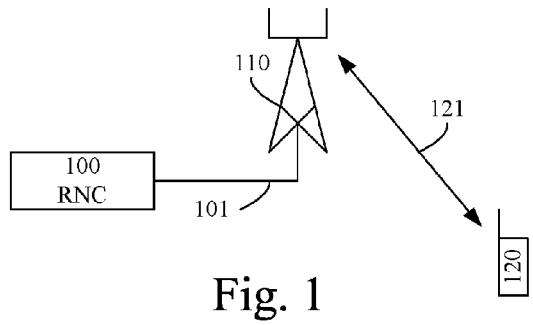
FIG. 1 is a schematic diagram of a part of a cellular communication system according to some embodiments.
Figure 2:
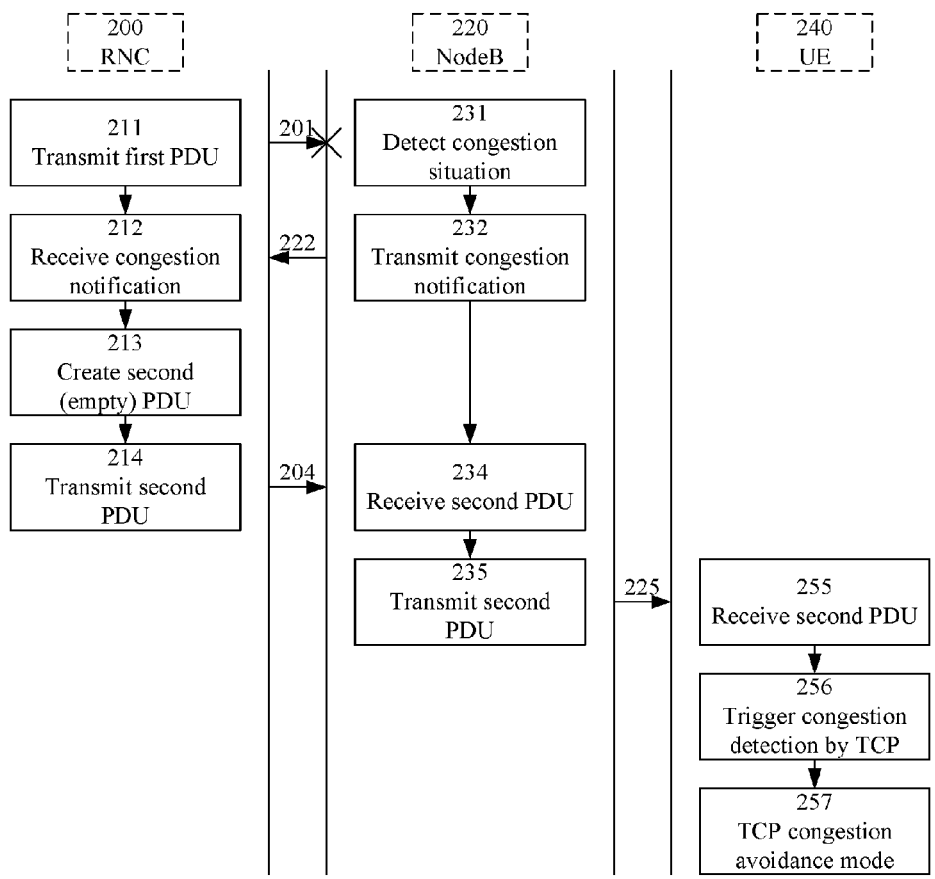
FIG. 2 is a combined flowchart and signaling diagram illustrating example method steps and signaling according to some embodiments.

FIG. 2 is a combined flowchart and signaling diagram illustrating an example congestion control method of a cellular communication system comprising a radio network controller (RNC) 200, a base station (NodeB) 220, and a wireless communication device (UE) 240. The RNC 200 is connectable to the base station 220 via a transport network and the base station 220 is connectable to the UE 240 via a radio link. The method steps 211, 212, 213, 214 are performed by the RNC 200, the method steps 231, 232, 234, 235 are performed by the base station 220, and the method steps 255, 256, 257 are performed by the UE 240.

In step 211, the RNC 200 transmits a first protocol data unit (PDU) over the transport network towards the base station 220 as illustrated by arrow 201. The first PDU has a first sequence number (SN).

Due to congestion of the transport network, the first PDU is lost during transmission over the transport network as illustrated by the cross at the tip of arrow 201. In step 231, the base station 220 detects the congestion situation of the transport network by detecting loss of the first protocol data unit during transmission over the transport network. The detection in step 231 may be according to any suitable known or future method, for example, the method described in "HSDPA/HSUPA Handbook", CRC Press 2010, edited by Borko Furht and Syed A. Ahsson, pp. 297-330, Chapter 9, "HSPA Transport Network Layer Congestion Control", by Szilveszter Nádas, Sándor Rácz and Pál L. Pályi.

When a congestion situation is detected, the base station 220 transmits a congestion notification in the form of a notification message indicative of the detected congestion situation over the transport network towards the RNC 200 as illustrated by arrow 222, and in step 212, the RNC 220 receives the notification message. The notification message may be any suitable known or future message. For example, the notification message may be one of a High Speed Data Shared CHannel Protocol Data Unit Drop Indication Iub Framing Protocol Control Frame (HS-DSCH PDU drop indication Iub FP CF) and a High Speed Data Shared CHannel Capacity Allocation Iub Framing Protocol Control Frame (HS-DSCH CA Iub FP CF) as defined in the 3GPP Technical Specification (TS) 25.435, version 11.1.0 of December 2012, pp. 58-61.

With reference to Section 6.3.3.13 TS 25.435, the HS-DSCH PDU drop indication Iub FP CF may be used to transmit such information to the RNC-side Iub FP due to that an allowed reason for indicating drop corresponds to the applicable situation. The HS-DSCH PDU drop indication Iub FP CF contains an information element (IE) that may be used to indicate the number of dropped PDUs, as well as IEs for indicating the sequence number(s) of the dropped PDU(s) and the corresponding PDU index in the Iub Frame.

If the HS-DSCH CA Iub FP CF is applied for congestion notification, the Spare Extension IE may be used. In the Spare Extension IE, similar information may be conveyed as exemplified for the HS-DSCH PDU drop indication Iub FP CF above.

In another embodiment, the congestion situation may be indicated to RNC through the already standardized Capacity Allocation Control Frame (CA CF).

In "HSDPA/HSUPA Handbook", CRC Press 2010, edited by Borko Furht and Syed A. Ahsson, pp. 297-330, Chapter 9, "HSPA Transport Network Layer Congestion Control", by Szilveszter Nádas, Sándor Rácz and Pál L. Pályi, identification at NodeB of missing RLC PDUs is presented and several options are proposed for conveying the identification of lost RLC PDUs (both over the transport network and over the air interface).

When the congestion notification is received, the RNC 200 creates a second, empty, PDU in step 213. Typically, the Iub Framing Protocol (FP) of the RNC may notify a radio link controller (RLC) of the RNC in any suitable way, and the RLC may create the second, empty, PDU. One purpose of creating an empty PDU is to indicate the congestion situation to the Transmission Control Protocol (TCP) at the UE, with minimal extra transmission.

In step 214, the RNC 200 transmits the second protocol data unit (PDU) over the transport network towards the base station 220 as illustrated by arrow 204, and the second PDU is received by the base station 220 in step 234.

Typically, steps 212, 213, 214 are repeated as each time a loss occurs due to the congestion. Alternatively or additionally, the congestion notification message may comprise information regarding several lost PDUs in a single message. In such embodiments, a corresponding number of empty PDUs may be created in response to a single congestion notification message.

An interface of the transport network (e.g. the Iub interface as defined in the 3GPP standard) is used for the transmissions of steps 211, 232, 214.

In step 235, the second PDU is transmitted from the base station 220 to the UE 240 via an air interface of the radio link, and the IE 240 receives the second PDU in step 255.

At the UE 240, the received second PDU is decoded and, since the PDU is empty, the TCP will detect the congestion situation and enter TCP congestion avoidance mode as illustrated by step 257. The TCP may detect the congestion based on occurrence of decoding errors. In one example implementation, a cyclic redundancy check of the decoding of the second PDU will fail due to that the second PDU is empty and the TCP will detect the congestion situation accordingly.

Typically, the TCP congestion detection is made by the transmitter side of the TCP (e.g. an Internet server) in response to the receiver side of the TCP (e.g. the UE of FIG. 2) triggering the detection as illustrated in step 526. The triggering of the detection may, for example, comprise sending a NACK (not acknowledged) indication from the receiver side TCP to the transmitter side TCP in response to, e.g., a cyclic redundancy check failure.

When the transmitter side of the TCP detects congestion (e.g. in response to a trigger such as the NACK indication) it typically initiates entering of the TCP congestion avoidance mode (or state) for the TCP transmitter and receiver side (illustrated by step 257 for the TCP receiver side).

See e.g. RFC 5681 "TCP congestion control", section 3.1 (available from http://tools.ietf.org/html/rfc5681) for an explanation of TCP congestion avoidance mode.

A benefit of the approach to create an empty PDU is that the TPC is notified of the congestion situation using a minimum amount of transmission resources since no "dummy" data (data that is known to be discarded when received) is transmitted.

According to one example, the creation of the second PDU in step 213 may comprise assigning the first sequence number (i.e. the sequence number of the first, lost, PDU) to the second PDU. This approach may have the benefit that no re-transmission of the lost PDU will be initiated by the re-transmission protocol (e.g. HSDPA/RLC AM) since the empty PDU will take its place.

For such an approach, the notification message 222 transmitted by the base station 220 in step 232 and received by the RNC in step 200 may typically be indicative of the first sequence number. For example, the notification message 222 may comprise the first sequence number.

According to another example, the creation of the second PDU in step 213 may comprise assigning the next available sequence number in a consecutive sequence of yet unused sequence numbers of the radio link controller to the second PDU.

According to some embodiments, several empty PDUs may be created in accordance with step 213 and transmitted in accordance with step 214. For example, one or more further, empty, PDUs may be created and transmitted, each having a sequence number of a respective lost PDU or each having a respective next available sequence number in a consecutive sequence of yet unused sequence numbers of the radio link controller.

FIG. 3 is a flowchart illustrating an example congestion control method of a radio network controller (RNC) such as, for example, the RNC 200 of FIG. 2.

The method starts in step 311 where a PDU with a non-empty payload is created, i.e. a conventional PDU (compare with the first PDU of FIG. 2). The created PDU is transmitted in step 312 (compare with step 211 of FIG. 2).

When a new PDU is to be created, it is checked in step 313 whether or not a congestion notification (compare with 222 of FIG. 2) has been received. If a congestion notification has been received (Yes-step out from step 313), an empty PDU (i.e. without payload) is created in step 314 (compare with step 213 of FIG. 2) and transmitted in step 312. If a congestion notification has not been received (No-step out from step 313), the method returns to step 311.

In some embodiments, there may not be an explicit checking step 313. In stead, reception of the congestion notification may, for example, trigger an operation mode of the RNC that provides for the creation of the empty PDU in step 314.

FIG. 4 is a schematic block diagram illustrating an example cellular communication system comprising a radio network controller (RNC) 400, a base station (NodeB) 420, and a wireless communication device (UE) 440. The RNC 400 is operatively connectable to the base station 420 via a transport network 410 having respective interfaces (Iub) 401, 421 and the base station 420 is operatively connectable to the UE 440 via a radio link 430 having respective interfaces (Uu) 426, 446.

The RNC 400 is adapted to perform a congestion control method according to some embodiments. The RNC 400 may, for example, be adapted to perform the method steps 211, 212, 213, 214 of FIG. 2 and/or the method of FIG. 3, the base station 420 may, for example, be adapted to perform the method steps 231, 232, 234, 235 of FIG. 2, and the UE 440 may, for example, be adapted to perform the method steps 255, 256, 257 of FIG. 2.

The RNC 400 comprises a congestion control arrangement comprising a transmitter (TX) 403, a receiver (RX) 402 and a radio link controller (RLC) 404. The transmitter and receiver are operatively connectable to the transport network 410 via the interface 401, and the RLC 404 is operatively connectable to the transmitter 403 and to the receiver 402. The congestion control arrangement may, for example, be adapted to perform the method steps 211, 212, 213, 214 of FIG. 2 and/or the method according to FIG. 3.

The transmitter 403 is adapted to transmit protocol data units (e.g. a first and a second PDU) over the transport network 410 to the base station 420 (compare with steps 211 and 214 of FIG. 2 and with step 312 of FIG. 3).

The receiver 402 is adapted to receive (e.g. in response to the transmitter 403 transmitting a first protocol data unit) a notification message indicative of a congestion situation of the transport network from the base station 420 via transport network (compare with step 212 of FIG. 2 and with step 313 of FIG. 3).

The radio link controller 404 is adapted to create the protocol data units (compare with step 213 of FIG. 2 and with steps 311 and 314 of FIG. 3). Particularly, the radio link controller 404 is adapted to—in response to the receiver 402 receiving a notification message—create a (second) protocol data unit as an empty protocol data unit to indicate the congestion situation to the TCP 449 of the UE 440 (compare with step 213 of FIG. 2 and with step 314 of FIG. 3).

The congestion control arrangement may further comprise a controller (CNTR) 405 adapted to control operation of one or more of the transmitter 403, the receiver 402 and the RLC 404.

The base station 420 comprises a transport network transmitter (TX) 422, a transport network receiver (RX) 423 and a radio congestion detector (DET) 424. The transport network transmitter and the transport network receiver are operatively connectable to the transport network 410 via the interface 421, and the congestion detector 424 is operatively connectable to the transport network transmitter 422 and to the transport network receiver 423. The base station 420 also comprises a radio link transmitter (TX) 427 and a radio link receiver (RX) 427. The radio link transmitter and the radio link receiver are operatively connectable to the radio link 430 via the interface 426, and the radio link transmitter 428 is operatively connectable to the transport network receiver 423.

The transport network receiver 423 is adapted to receive protocol data units (compare with step 234 of FIG. 2), and the radio link transmitter 428 is adapted to transmit the protocol data units received by the transport network receiver 423 to the UE 440 via the radio link 430 (compare with step 235 of FIG. 2).

The congestion detector 424 is adapted to detect a congestion situation of the transport network 410 by detecting loss of a protocol data unit (e.g. the first PDU) during transmission over the transport network (compare with step 231 of FIG. 2).

The transport network transmitter 422 is adapted to (in response to the congestion detector 424 detecting the congestion situation) transmit a notification message indicative of the detected congestion situation to the RNC 400 via the transport network 410 (compare with step 232 of FIG. 2).

The base station may further comprise a controller (CNTR) 425 adapted to control operation of one or more of the transport network transmitter 422, the transport network receiver 423, the radio congestion detector 424, the radio link transmitter 427 and the radio link receiver (RX) 427.

The UE 440 comprises a receiver (RX) 448, a transmitter (TX) 447 and a TCP module (TCP) 449. The transmitter and the receiver are operatively connectable to the radio link 430 via the interface 446, and the receiver 448 is operatively connectable to the TCP unit 449.

The receiver 448 is adapted to receive protocol data units (compare with step 255 of FIG. 2), and the TCP module 449 is adapted to trigger detection a congestion situation based on decoding of the second protocol data unit (compare with step 256 of FIG. 2) and enter a congestion avoidance mode of the TCP in response thereto (compare with step 257 of FIG. 2).

The UE may further comprise a controller (CNTR) 445 adapted to control operation of one or more of the receiver 448, the transmitter 447 and the TCP module 449.

Figure 5:
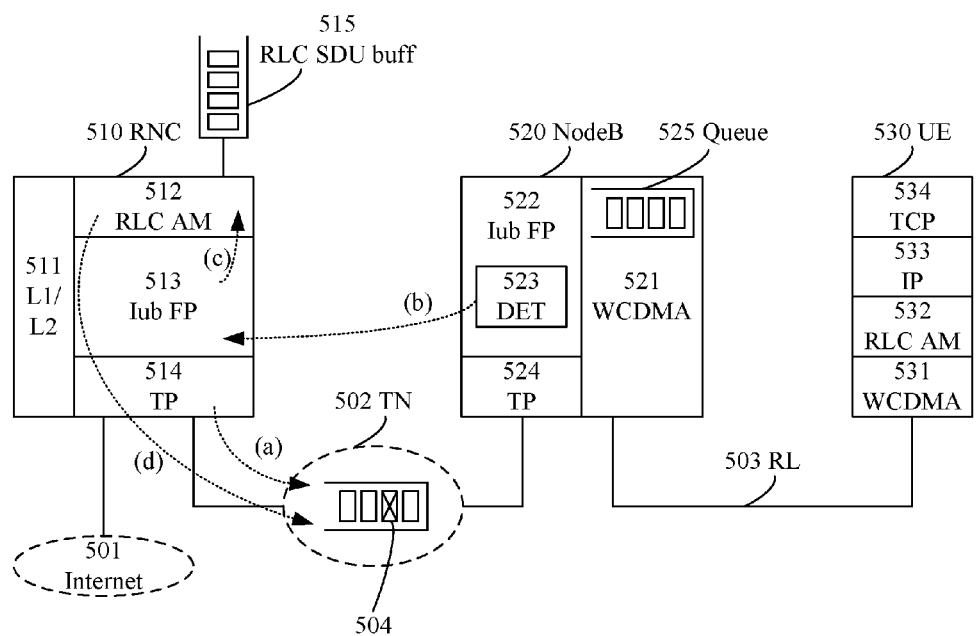
FIG. 5 is a block diagram illustrating example arrangements according to some embodiments.

FIG. 5 is another schematic block diagram illustrating an example cellular communication system comprising a radio network controller (RNC) 510, a base station (NodeB) 520, and a wireless communication device (UE) 530. The RNC 510 is operatively connectable to the base station 520 via a transport network (TN) 402 having respective interfaces (Iub Framing Protocol (Iub FP) 513, 522 and Transport Protocol (TP) 514, 524). The base station 520 is operatively connectable to the UE 530 via a radio link (RL) 503 via Wideband Code Division Multiple Access (WCDMA) technique as indicated by 521 and 531.

The RNC 510 may, for example, be adapted to perform the method steps 211, 212, 213, 214 of FIG. 2 and/or the method of FIG. 3. According to some embodiments, the RNC 510 corresponds to or is similar to the RNC 400 of FIG. 4. The base station 20 may, for example, be adapted to perform the method steps 231, 232, 234, 235 of FIG. 2. According to some embodiments, the base station 520 corresponds to or is similar to the base station 420 of FIG. 4. The UE 530 may, for example, be adapted to perform the method steps 255, 256, 257 of FIG. 2, and according to some embodiments, the UE 530 corresponds to or is similar to the UE 440 of FIG. 4.

In the example of FIG. 5, the RNC 510 is connected to the Internet 501 by any suitable means. In a conventional manner, Layer 1 and Layer 2 (L1/L2) 511 of the RNC 510 comprises a Transport Protocol (TP) 514, a Iub Framing Protocol 513 and a Radio Link Controller Acknowledged Mode protocol (RLC AM) 512. The RLC AM 512 has access to a Radio Link Controller Service Data Unit buffer (RLC SDU buff) 515 comprising data units in queue for transmission over the transport network 502.

When a PDU has created by the RLC of the RNC 510, it is transmitted over the transport network 502, (a). In a situation where the transport network is congested, a PDU may be lost during transmission over the transport network 502 as illustrated by 504. This is congestion event is detected by a detector (DET) 523 of the base station 520, for example, in a manner as has been described above. A congestion notification is sent from the Iub of the base station to the Iub of the RNC over the transport network (b), for example, in a manner as has been described above. The Iub of the RNC notifies the RLC 512 of the congestion situation (c) and the RLC 512 creates an empty PDU for transmission (d), for example, in a manner as has been described above.

When the empty PDU reaches the TCP 534 of the UE 530 (typically after being transmitted over the radio link 503 from a transmission queue 525 of the base station 520 to the UE 530, and being unpacked and decoded according to respective applicable layers and protocols in the UE 530, e.g. a physical layer (WCDMA) 531, an RLC AM 532, and an Internet Protocol (IP) 533), the TCP (comprising a transmitter side, e.g. in a server of the Internet 501, and a receiver side in the UE 530) detects the congestion and may enter a congestion avoidance mode, for example, in a manner as has been described above.

Thus, a typical example implementation according to some embodiments may be described as follows. When congestion is detected by the Node B-side Iub FP, the RNC-side Iub FP is notified (e.g. via the HS-DSCH Drop Indication Iub FP Control Frame message). The RNC-side Iub FP protocol notifies the RLC about the RLC Data PDUs affected in the congestion. Then, the sequence numbers of the PDUs are read and empty RLC Data PDUs (e.g. PDUs with no payload—payload size zero) with the same sequence numbers are created and sent as re-transmissions. The RNC-side RLC entity typically re-transmits empty RLC Data PDUs as long as the congestion holds, and thereby, minimizes the extra burden on the transport links. The UE-side RLC protocol acknowledges the empty RLC PDU (in case of successful transmission), but the packet will be discarded due its zero size on IP level. Hence, the TCP detects the missing packet and enters congestion avoidance mode (or state). Thus, an IP packet drop is indirectly indicated and the amount of data unnecessarily sent over the already congested transport network and radio interface is minimized.

More generally, efficient methods to handle transport network congestion in a re-transmission protocol based network (e.g. a HSDPA network) are provided according to some embodiments by introduction of an additional feature into the RNC-side of the RLC protocol. The feature enables the RNC-side RLC to create (and send) an empty RLC PDU with, for example, the same sequence number as a lost or congested RLC PDU. Thus, minimum sized RLC PDUs are sent from the RNC towards the Node B (and thereafter towards the UE) to indicate packet loss. Hence, the congestion information intended for the TCP will be acknowledged by the UE-side RLC (an empty RLC SDU) and no re-transmission will occur for the empty packet (as long as the empty PDU itself was successfully transmitted). Furthermore, the congestion information intended for the TCP will be discarded at IP level due to its zero size (empty payload) and the TCP is notified about the congestion accordingly.

According to some embodiments, it may be required to introduce a few new functionalities may into the RNC-side RLC protocol, e.g. capability to create empty RLC PDUs, possibly with specified sequence numbers such as, for example, the sequence number of the respective lost or congested RLC PDUs.

If multiple RLC PDUs are affected by the congestion, the RNC-side RLC functionality typically creates and sends multiple empty RLC PDUs towards the UE in place of re-transmission of the congested ones.

According to the latest standard of the flexible version of the RLC protocol (see for example 3GPP TS 25.322) there is no lower limit on the data size of the (flexible) RLC AM PDU in the downlink. Thus, a PDU with empty payload should be accepted and acknowledged by the UE-side RLC entity without any modification in the UE-side RLC functionality.

The solution according to some embodiments may minimize the data sent into the already congested transport network. The solution according to some embodiments may increase the utilization of the transport network and/or the radio interface by avoiding repeated transmission of the same RLC PDUs. The solution according to some embodiments may increase the utilization of the transport network and/or the radio interface by avoiding transmission of PDUs that will be dropped at the receiver. The solution according to some embodiments may decrease the end-to-end round trip time (RTT), e.g. by decreasing the load on the transport network and/or by speeding up the notification of the congestion situation.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a radio network controller or other suitable network node of a cellular communication network) comprising circuitry/logic or performing methods according to any of the embodiments. The electronic apparatus may, for example, be a radio network controller or other suitable network node of a cellular communication network, a USB-stick, a plug-in card, or an embedded drive.

Figure 6:
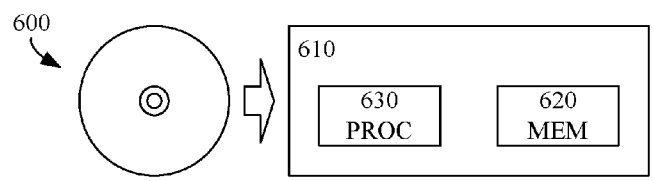
FIG. 6 is a schematic drawing illustrating a computer readable medium according to some embodiments.

According to some embodiments, a computer program product comprises a computer readable medium such as, for example, a diskette or a CD-ROM as illustrated by the CD-ROM 600 of FIG. 6. The computer readable medium may have stored thereon a computer program comprising program instructions. The computer program may be loadable into a data-processing unit 630, which may, for example, be comprised in a radio network controller 610 or other suitable network node of a cellular communication network. When loaded into the data-processing unit, the computer program may be stored in a memory 620 associated with or integral to the data-processing unit. According to some embodiments, the computer program may, when loaded into and run by the data-processing unit, cause the data-processing unit to execute method steps according to, for example, the methods shown in any of the FIGS. 2 and 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A congestion control method of a radio network controller of a cellular communication system, wherein the radio network controller comprises a radio link controller and wherein the radio network controller is connectable to a base station of the cellular communication system via a transport network and the base station is connectable to a wireless communication device via a radio link, the method comprising:
  transmitting, to the base station via an interface of the transport network, a first protocol data unit having a first sequence number;
  receiving, from the base station via the interface of the transport network, a notification message indicative of a congestion situation of the transport network;
  creating, by the radio link controller, a second protocol data unit, wherein the second protocol data unit is empty with no payload to indicate the congestion situation to a Transmission Control Protocol—TCP— of the wireless communication device, wherein the second protocol data unit comprises a next available sequence number in a consecutive sequence of yet unused sequence numbers of the radio link controller;
  transmitting, to the base station via the interface of the transport network, the second protocol data unit;
  creating, by the radio link controller, one or more further protocol data units, wherein the one or more further protocol data units are empty with no payload and each comprises a corresponding sequence number; and
  transmitting, to the base station via the interface of the transport network, the one or more further protocol data units.

2. The method of claim 1 wherein the congestion situation comprises a loss of the first protocol data unit during transmission over the transport network.

3. The method of claim 2 wherein the notification message is further indicative of the first sequence number.

4. The method of claim 1 wherein the notification message comprises one of a High Speed Data Shared CHannel—HS-DSCH—Protocol Data Unit Drop Indication Iub Framing Protocol Control Frame and a HS-DSCH Capacity Allocation Iub Framing Protocol Control Frame as defined in the Third Generation Partnership Technical Specification 25.435, version 11.1.0 of December 2012.

5. A congestion control method of a cellular communication system comprising a radio network controller, a base station and a wireless communication device, wherein the radio network controller comprises a radio link controller, wherein the radio network controller is connectable to the base station via a transport network and wherein the base station is connectable to the wireless communication device via a radio link, the method comprising:
  transmitting, from the radio network controller to the base station via an interface of the transport network, a first protocol data unit having a first sequence number;
  detecting, by the base station, a congestion situation of the transport network by detecting loss of the first protocol data unit during transmission over the transport network;
  transmitting, from the base station to the radio network controller via the interface of the transport network, a notification message indicative of the detected congestion situation;
  receiving, by the radio network controller, the notification message;
  creating, by the radio link controller of the radio network controller, a second protocol data unit, wherein the second protocol data unit is empty with no payload to indicate the congestion situation to a Transmission Control Protocol—TCP—of the wireless communication device, wherein the second protocol data unit comprises a next available sequence number in a consecutive sequence of yet unused sequence numbers of the radio link controller;
  creating, by the radio link controller, one or more further protocol data units, wherein the one or more further protocol data units are empty with no payload and each comprises a corresponding sequence number;
  transmitting, from the radio network controller to the base station via the interface of the transport network, the second protocol data unit and the one or more further protocol data units;
  receiving, by the base station, the second protocol data unit and the one or more further protocol data units;
  transmitting, from the base station to the wireless communication device via an air interface of the radio link, the second protocol data unit and the one or more further protocol data units;
  receiving, by the wireless communication device, the second protocol data unit and the one or more further protocol data units;
  triggering, by the TCP of the wireless communication device, detection of the congestion situation based on decoding of the second protocol data unit and the one or more further protocol data units; and
  entering a congestion avoidance mode of the TCP.

6. A congestion control arrangement for a radio network controller of a cellular communication system, wherein the radio network controller is connectable to a base station of the cellular communication system via a transport network and the base station is connectable to a wireless communication device via a radio link, the arrangement comprising:
  a transmitter adapted to transmit, to the base station via an interface of the transport network, a first protocol data unit having a first sequence number, a second protocol data unit, and one or more further protocol data units;
  a receiver adapted to receive, from the base station via the interface of the transport network and in response to the transmitter transmitting the first protocol data unit, a notification message indicative of a congestion situation of the transport network; and
  a radio link controller adapted to:
  create the first protocol data unit; and
  in response to the receiver receiving the notification message;
  create the second protocol data unit as an empty protocol data unit with no payload to indicate the congestion situation to a Transmission Control Protocol—TCP— of the wireless communication device, wherein the second protocol data unit comprises a next available sequence number in a consecutive sequence of yet unused sequence numbers of the radio link controller; and create the one or more further protocol data units as empty protocol data units with no payload and each comprises a corresponding sequence number.

7. The arrangement of claim 6 wherein the congestion situation comprises a loss of the first protocol data unit during transmission over the transport network, wherein the notification message is further indicative of the first sequence number.

8. The arrangement of claim 6 wherein the one or more further protocol data units each have
- a respective next available sequence number in a consecutive sequence of yet unused sequence numbers of the radio link controller.

9. A cellular communication system comprising a radio network controller, a base station and a wireless communication device, wherein the radio network controller is connectable to the base station via a transport network and wherein the base station is connectable to the wireless communication device via a radio link, the system comprising:
- a transmitter of the radio network controller adapted to transmit, to the base station via an interface of the transport network, a first protocol data unit having a first sequence number, a second protocol data unit, and one or more further protocol data units;
- a congestion detector of the base station adapted to detect a congestion situation of the transport network by detecting loss of the first protocol data unit during transmission over the transport network;
- a transport network transmitter of the base station adapted to transmit, to the radio network controller via the interface of the transport network and in response to the congestion detector detecting the congestion situation, a notification message indicative of the detected congestion situation;
- a receiver of the radio network controller adapted to receive the notification message;
- a radio link controller of the radio network controller adapted to:
create the first protocol data unit; and
in response to the receiver receiving the notification message;
create the second protocol data unit as an empty protocol data unit with no payload to indicate congestion to a Transmission Control Protocol—TCP—of the wireless communication device, wherein the second protocol data unit comprises a next available sequence number in a consecutive sequence of yet unused sequence numbers of the radio link controller; and
create the one or more further protocol data units as empty protocol data units with no payload and each comprises a corresponding sequence number;
- a receiver of the base station adapted to receive the second protocol data unit and the one or more further protocol data units;
- a radio link transmitter of the base station adapted to transmit, to the wireless communication device via an air interface of the radio link, the second protocol data unit and the one or more further protocol data units;
- a receiver of the wireless communication device adapted to receive the second protocol data unit and the one or more further protocol data units; and
- a TCP module of the wireless communication device adapted to:
trigger detection of the congestion situation based on decoding of the second protocol data unit and the one or more further protocol data units; and
enter a congestion avoidance mode of the TCP.

* * * * *